(12) United States Patent
Nozaki et al.

(10) Patent No.: US 9,527,378 B2
(45) Date of Patent: Dec. 27, 2016

(54) ELECTRIC VEHICLE

(71) Applicant: KAWASAKI JUKOGYO KABUSHIKI KAISHA, Kobe-shi, Hyogo (JP)

(72) Inventors: Takuma Nozaki, Aioi (JP); Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/438,574

(22) PCT Filed: Oct. 25, 2012

(86) PCT No.: PCT/JP2012/006861
§ 371 (c)(1),
(2) Date: Apr. 24, 2015

(87) PCT Pub. No.: WO2014/064738
PCT Pub. Date: May 1, 2014

(65) Prior Publication Data
US 2015/0283896 A1    Oct. 8, 2015

(51) Int. Cl.
*B60K 11/06* (2006.01)
*B60K 1/04* (2006.01)
(Continued)

(52) U.S. Cl.
CPC ............... *B60K 11/06* (2013.01); *B60K 1/04* (2013.01); *B60K 13/06* (2013.01); *B60L 1/003* (2013.01);
(Continued)

(58) Field of Classification Search
CPC ........... B60K 11/06; B60K 1/04; B60K 13/02; B60K 13/04; B60K 13/06; B60K 2001/003; B60K 2001/005; B60K 2001/006; B60K 2001/0422; B60K 2001/0427; B60K 2001/0438; B60L 11/1874; B60L 11/1877; B60L 11/1879; B60L 1/003; B60L 15/007
(Continued)

(56) References Cited

U.S. PATENT DOCUMENTS

| | | | | |
|---|---|---|---|---|
| 5,086,858 A | * | 2/1992 | Mizuta | B60K 11/06 123/41.56 |
| 8,556,017 B2 | * | 10/2013 | Kubota | B60K 1/04 180/68.1 |
| 8,701,811 B2 | * | 4/2014 | Robinson | B60K 11/06 180/68.2 |

FOREIGN PATENT DOCUMENTS

| | | |
|---|---|---|
| JP | H05169981 A | 7/1993 |
| JP | 2002120565 A | 4/2002 |

(Continued)

OTHER PUBLICATIONS

Mechanical translation of JP 2002-120565, Apr. 23, 2002.*
(Continued)

*Primary Examiner* — John Walters
(74) *Attorney, Agent, or Firm* — Alleman Hall McCoy & Russell & Tuttle LLP

(57) ABSTRACT

An air supply mechanism of an electric vehicle includes: a first air flowing pipe; a second air flowing pipe; and an air blower configured to generate a flow of air such that the air flows through a first air inlet into a first air flowing pipe and is discharged through a first air outlet to electric component accommodating spaces, and the air in the electric component accommodating spaces flows through a second air inlet into a second air flowing pipe and is discharged through a second air outlet to a space outside a vehicle body. The first air inlet and the second air outlet are arranged higher than a first battery, a second battery, and an inverter serving as "electric components."

14 Claims, 5 Drawing Sheets

(51) Int. Cl.
*B60L 1/00* (2006.01)
*B60L 11/18* (2006.01)
*B60L 15/00* (2006.01)
*B60K 13/06* (2006.01)
*B60K 1/00* (2006.01)

(52) U.S. Cl.
CPC ........ *B60L 11/1874* (2013.01); *B60L 11/1877* (2013.01); *B60L 11/1879* (2013.01); *B60L 15/007* (2013.01); *B60K 2001/003* (2013.01); *B60K 2001/005* (2013.01); *B60K 2001/0422* (2013.01); *B60K 2001/0438* (2013.01); *B60L 2200/22* (2013.01); *B60L 2240/525* (2013.01); *B60L 2240/545* (2013.01); *B60Y 2200/141* (2013.01); *Y02T 10/7005* (2013.01); *Y02T 10/705* (2013.01)

(58) Field of Classification Search
USPC ...................................... 180/68.1, 68.2, 68.3
See application file for complete search history.

(56) References Cited

FOREIGN PATENT DOCUMENTS

| | | |
|---|---|---|
| JP | 2004142524 A | 5/2004 |
| JP | 2007284028 A | 11/2007 |
| WO | 2012029088 A1 | 3/2012 |

OTHER PUBLICATIONS

Mechanical translation of JP 2004-142524, May 20, 2004.*
Mechanical translation of JP H05-169981, Jul. 9, 1993.*
Mechanical translation of WO 2012-029088, Mar. 8, 2012.*
ISA Japanese Patent Office, International Search Report Issued in Application No. PCT/JP2012/006861, Dec. 25, 2012, WIPO, 6 pages.

* cited by examiner

ELECTRIC VEHICLE

TECHNICAL FIELD

The present invention relates to an electric vehicle including an electric component (such as a battery) which generates heat from electric energy for generating rotational power for driving wheels.

BACKGROUND ART

PTL 1 describes one example of a conventional vehicle. The vehicle includes a cabin frame. A seat is provided at a boarding space surrounded by the cabin frame, and an engine is provided under the seat.

CITATION LIST

Patent Literature

PTL 1: Japanese Laid-Open Patent Application Publication No. 2007-284028

SUMMARY OF INVENTION

Technical Problem

In a case where the engine of the vehicle of PTL 1 is replaced with a motor, the vehicle requires a battery for supplying electric power to the motor. In a case where the battery is arranged inside a vehicle body frame, heat generated by the battery does not naturally radiate well. Therefore, there may be a case where a temperature of the battery becomes higher than a proper temperature, and this shortens the life of the battery. Further, in a case where water splashed by tires adheres to the battery when, for example, the vehicle is traveling on wet ground, the battery may be corroded by the water. In a case where the battery is accommodated in a sealed container or the like to prevent this corrosion, the heat generated by the battery naturally radiates even worse.

The present invention was made to solve the above problems, and an object of the present invention is to provide an electric vehicle capable of more effectively cooling down an electric component.

Solution to Problem

An electric vehicle according to the present invention includes: an electric component which generates heat from electric energy for generating rotational power for driving wheels; an electric component accommodating space accommodating the electric component; and an air supply mechanism configured to supply cooling air to the electric component accommodated in the electric component accommodating space, wherein: the air supply mechanism includes a first air flowing pipe including a first air inlet which is open in a space outside a vehicle body and a first air outlet communicating with the electric component accommodating space, a second air flowing pipe including a second air inlet communicating with the electric component accommodating space and a second air outlet which is open in the space outside the vehicle body, and an air blower configured to generate a flow of air such that air in the space outside the vehicle body flows through the first air inlet into the first air flowing pipe and is discharged through the first air outlet to the electric component accommodating space, and air in the electric component accommodating space flows through the second air inlet into the second air flowing pipe and is discharged through the second air outlet to the space outside the vehicle body; and the first air inlet and the second air outlet are arranged higher than the electric component.

According to this configuration, the air taken in through the first air inlet can be forcibly supplied to the electric component. Therefore, the electric component can be cooled down effectively. In addition, the first air inlet and the second air outlet are arranged higher than the electric component. Therefore, water splashed by tires while the vehicle is traveling on wet ground does not easily get into the first air flowing pipe and the second air flowing pipe through the first air inlet and the second air outlet.

Advantageous Effects of Invention

According to the above configuration, the present invention can provide the electric vehicle capable of suppressing the entering of the moisture and effectively cooling down the electric component.

DESCRIPTION OF EMBODIMENTS

Hereinafter, an embodiment according to the present invention will be explained in reference to the drawings. The directions mentioned in the following explanations are from the perspective of a driver of an electric vehicle. A rightward and leftward direction corresponds to a vehicle width direction.

Figure 1:
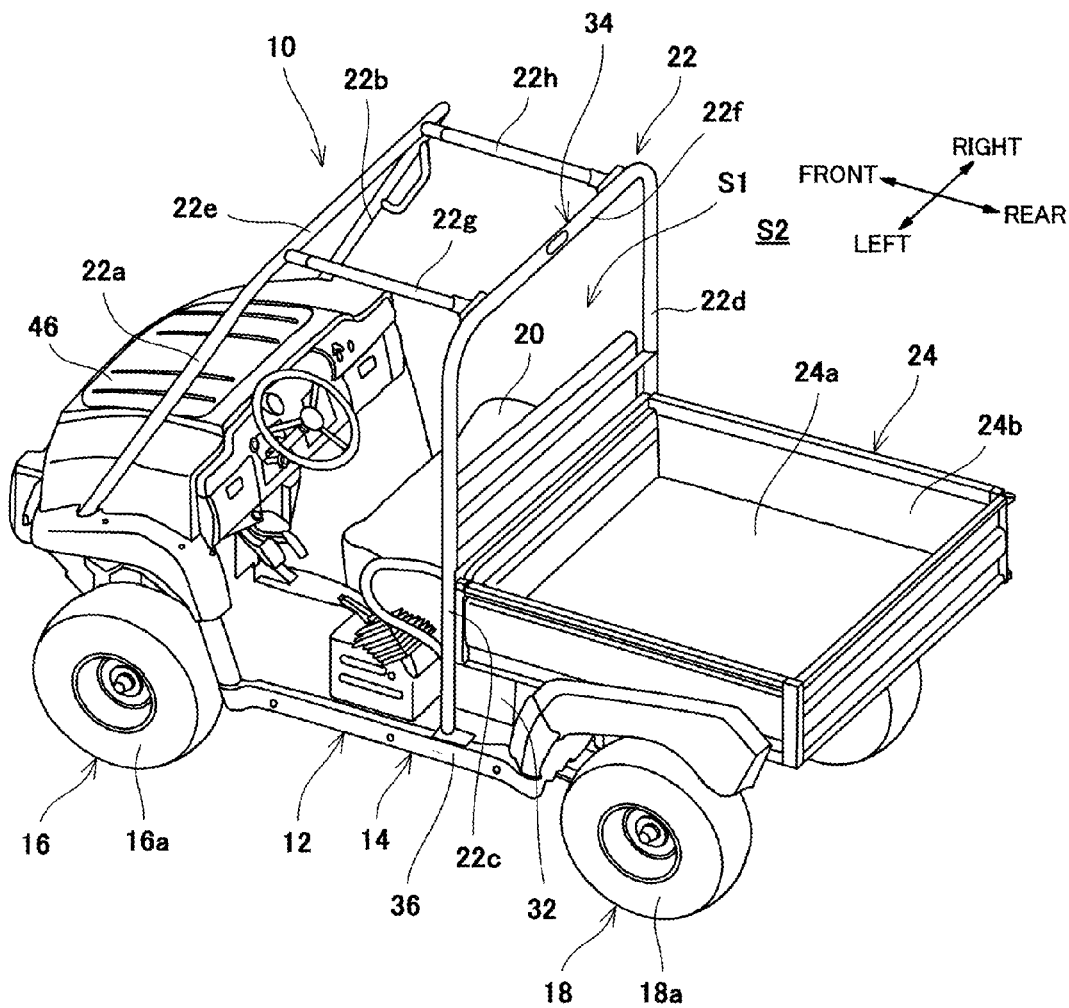
FIG. 1 is a perspective view showing a configuration of the electric vehicle according to an embodiment.
Figure 2:
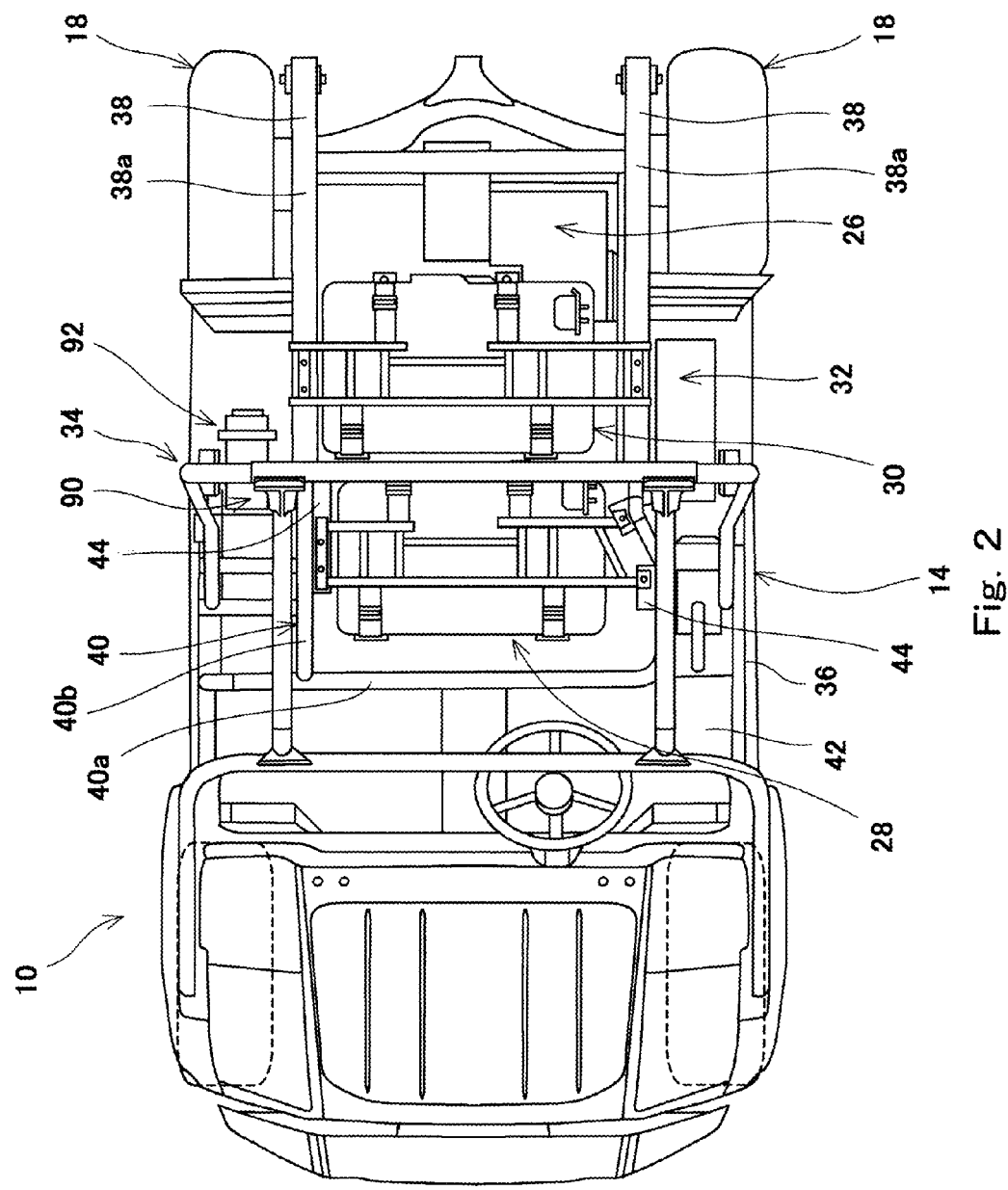
FIG. 2 is a plan view showing the configuration of the electric vehicle according to the embodiment.

FIG. 1 is a perspective view showing an electric vehicle 10 according to the embodiment. FIG. 2 is a plan view showing the configuration of the electric vehicle 10. It should be noted that FIG. 2 shows a state where a seat 20 and a cargo bed 24 are detached. The electric vehicle 10 according to the present embodiment does not include an internal combustion engine and generates rotational power by use of wheel-driving electric power, stored in batteries 54 and 72 (FIG. 3), to drive wheels 16 and 18. The electric vehicle 10 is a multipurpose vehicle, such as a golf cart or a carrier for agriculture, which can be used for various purposes and is sometimes called an electric utility vehicle.

As shown in FIG. 1, the electric vehicle 10 includes: a vehicle body frame 14 as a base of a vehicle body 12; a pair of left and right front wheels 16 suspended from a front portion of the vehicle body frame 14; a pair of left and right rear wheels 18 suspended from a rear portion of the vehicle body frame 14; the seat 20; a cabin frame 22; and the cargo bed 24. The front wheels 16 respectively include so-called balloon tires 16a, and the rear wheels 18 respectively include so-called balloon tires 18a. As shown in FIG. 2, the electric vehicle 10 further includes: a motor 26 configured to drive the rear wheels 18; a first battery pack 28; a second battery pack 30; an inverter unit 32; and an air supply mechanism 34.

As shown in FIG. 2, the vehicle body frame 14 includes: a floor frame 36 provided so as to face a road surface or a ground surface; a pair of left and right rear side frames 38 provided at a rear portion of the floor frame 36 so as to extend in a forward and rearward direction; and a seat frame 40 provided over the floor frame 36 and the rear side frames 38.

As shown in FIG. 2, the floor frame 36 is constituted by a metal square pipe or a metal round pipe. A plate-shaped floor panel 42 is attached to the floor frame 36, and the first battery pack 28 is mounted on the floor panel 42. The rear side frames 38 are constituted by metal square pipes, and cargo bed receiving portions 38*a* which receive the cargo bed 24 (FIG. 1) are respectively provided at upper portions of the rear side frames 38. A battery supporting member (not shown) that is a part of the vehicle body frame 14 is provided at a front portion of a region located between the left and right rear side frames 38 in a plan view, and the second battery pack 30 is mounted on the battery supporting member. The seat frame 40 includes: a cross pipe portion 40*a* supporting a front portion of the seat 20 (FIG. 1); and a pair of left and right longitudinal pipe portions 40*b* supporting both rightward and leftward direction side portions of the seat 20. The cross pipe portion 40*a* and the longitudinal pipe portions 40*b* are constituted by metal round pipes, and brackets 44 for attaching the first battery pack 28 are respectively formed at the left and right longitudinal pipe portions 40*b*.

As shown in FIG. 1, the seat 20 is a bench type seat on which a driver and a passenger (occupant) are seated. The seat 20 is provided at a forward and rearward direction middle portion of the vehicle body frame 14 so as to extend in the rightward and leftward direction. The cabin frame 22 is constituted by a metal round pipe so as to open front, rear, left, right, and upper portions of a boarding space S1 at which the seat 20 is provided. The vehicle body 12 does not include a door for entering into and getting out from the boarding space S1.

As shown in FIG. 1, the cabin frame 22 includes: a pair of left and right front pillar pipe portions 22*a* and 22*b*; a pair of left and right rear pillar pipe portions 22*c* and 22*d*; a front cross pipe portion 22*e* coupling upper end portions of the front pillar pipe portions 22*a* and 22*b* to each other; and a rear cross pipe portion 22*f* coupling upper end portions of the rear pillar pipe portions 22*c* and 22*d* to each other. The cabin frame 22 further includes a pair of left and right longitudinal pipe portions 22*g* and 22*h* which couple the front cross pipe portion 22*e* and the rear cross pipe portion 22*f* to each other at both vehicle width direction end portions of the front cross pipe portion 22*e* and both vehicle width direction end portions of the rear cross pipe portion 22*f*. Lower end portions of the front pillar pipe portions 22*a* and 22*b* are connected to the vehicle body frame 14 located at side portions of a hood 46 or in vicinities of the side portions of the hood 46. Lower end portions of the rear pillar pipe portions 22*c* and 22*d* are connected to the floor frame 36 at obliquely rear lower sides of the seat 20. The pipe portions 22*a* to 22*h* constituting the cabin frame 22 serve as "guard pipes" which protect the driver and the passenger. The rear pillar pipe portion 22*d*, which serves as a "first guard pipe," and the rear pillar pipe portion 22*c*, which serves as a "second guard pipe," are arranged to extend to an upper side of the seat 20.

As shown in FIG. 1, the cargo bed 24 includes: a bottom wall 24*a* having a square shape in a plan view; and a side wall 24*b* projecting upward from four sides of the bottom wall 24*a*. The cargo bed 24 is open upward. The cargo bed 24 includes a rotating shaft (not shown) provided at a rear portion of the cargo bed 24. By manually or automatically lifting up a front portion of the cargo bed 24, the cargo bed 24 inclines rearward.

As shown in FIG. 2, the motor 26 is a power unit configured to generate power for driving the rear wheels 18 (the rear wheels 18 and the front wheels 16 at the time of four-wheel driving). The inverter unit 32 configured to control the motor 26, the first battery pack 28, and the second battery pack 30 are electrically connected to the motor 26 through electric wires (not shown).

Figure 3:
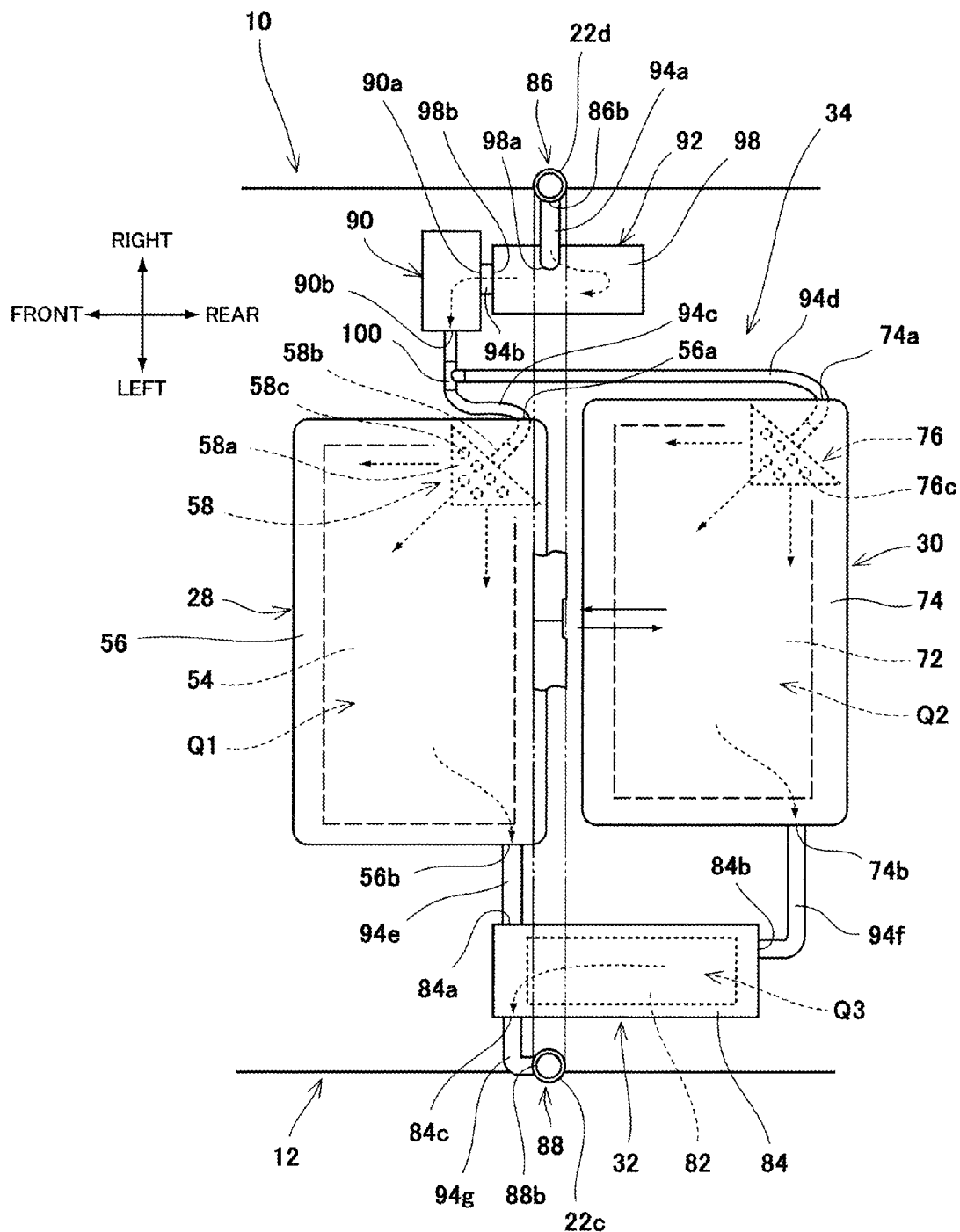
FIG. 3 is a plan view showing the configurations of electric components and an air supply mechanism.
Figure 4:
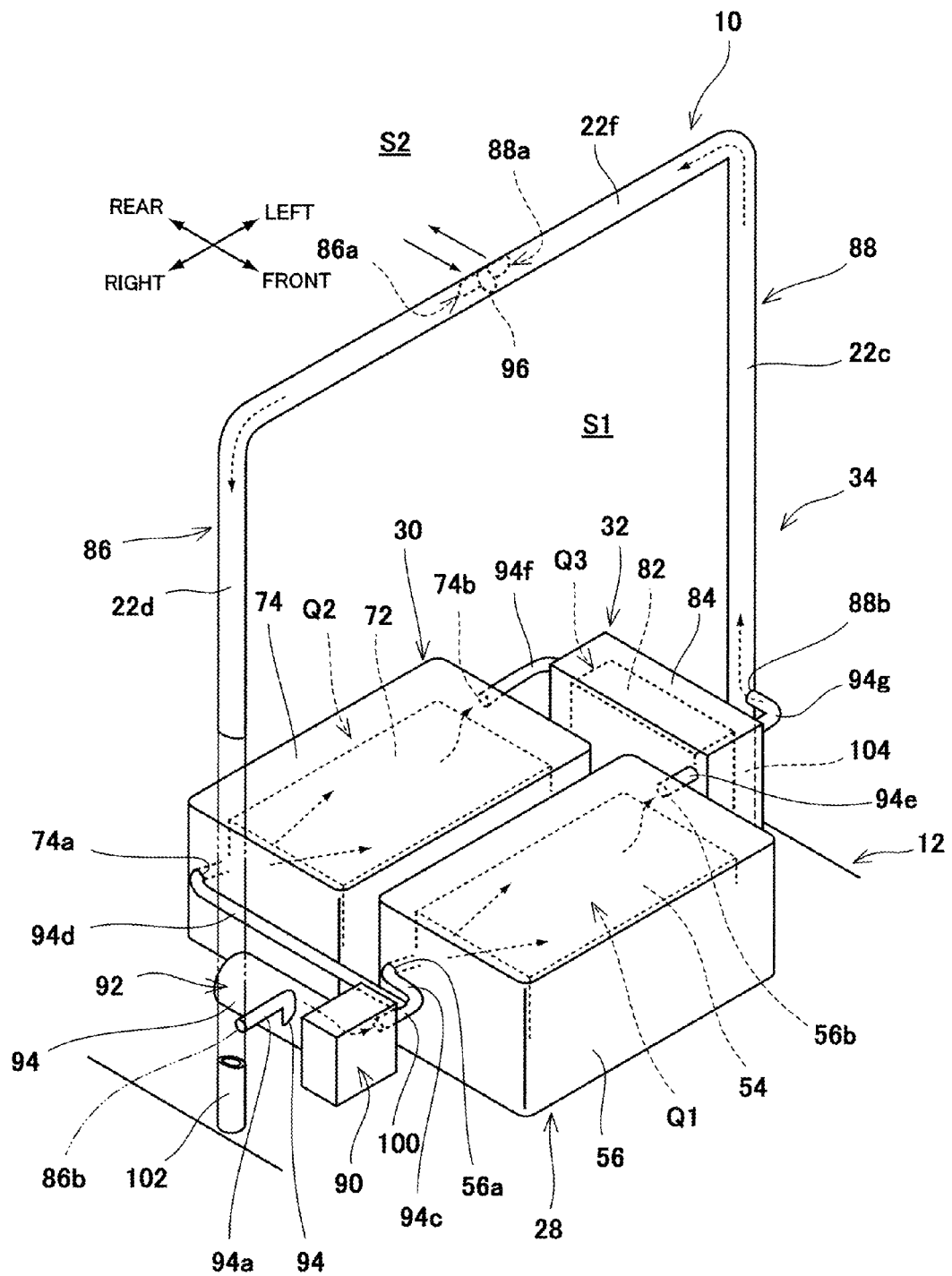
FIG. 4 is a perspective view showing the configurations of the electric components and the air supply mechanism.

FIG. 3 is a plan view showing the configurations of electric components and the air supply mechanism 34. FIG. 4 is a perspective view showing the configurations of the electric components and the air supply mechanism 34. A first battery 54, a second battery 72, and an inverter 82 serve as the "electric components" which generate heat from electric energy for generating rotational power for driving the wheels. The air supply mechanism 34 has a function of supplying cooling air to these "electric components". Arrows in FIGS. 3 and 4 show the flow of the air.

As shown in FIG. 3, the first battery pack 28 includes: a plurality of first batteries 54 storing the electric power for generating the rotational power for driving the wheels; a first battery accommodating container 56 made of insulating resin and accommodating the plurality of first batteries 54; and a first air diffuser 58 configured to diffuse the air inside the first battery accommodating container 56. The plurality of first batteries 54 are connected to one another in series to obtain a predetermined voltage.

As shown in FIG. 3, the first battery accommodating container 56 is formed in a rectangular solid shape configured such that a rightward and leftward direction length thereof is longer than a forward and rearward direction length thereof. An air inlet 56*a* through which the air is taken in is formed on one of rightward and leftward direction side surfaces (in the present embodiment, a right side surface) of the first battery accommodating container 56, and an air outlet 56*b* through which the air is discharged is formed on the other rightward and leftward direction side surface (in the present embodiment, a left side surface) of the first battery accommodating container 56. The first air diffuser 58 is provided inside the first battery accommodating container 56.

As shown in FIG. 3, the first air diffuser 58 diffuses air taken into the first battery accommodating container 56 through the air inlet 56*a* in a plurality of directions. The first air diffuser 58 includes: a box-shaped main body portion 58*a* having a polygonal shape (in the present embodiment, a triangular shape) in a plan view; a tubular air introducing portion 58*b* formed on one of surfaces of the main body portion 58*a*; and a plurality of air discharge holes 58*c* formed on at least two of the surfaces of the main body portion 58*a*. An upstream end portion of the air introducing portion 58*b* is arranged inside the first battery accommodating container 56 and in a vicinity of the air inlet 56*a*. It should be noted that the upstream end portion of the air introducing portion 58*b* may be inserted through the air inlet 56*a* and located outside the first battery accommodating container 56.

As shown in FIG. 3, gaps, through which the air discharged from the air discharge holes 58*c* of the first air diffuser 58 flows toward the air outlet 56*b* of the first battery accommodating container 56, are formed around the first batteries 54 accommodated in the first battery accommodating container 56. In the first battery accommodating container 56, a space accommodating the plurality of first batteries 54 (electric components) is a first electric component accommodating space Q1. The first battery pack 28 (including the first batteries 54) is arranged at a vehicle width direction middle portion of the vehicle body 12.

As shown in FIG. 3, the second battery pack 30 is substantially the same in configuration as the first battery pack 28. To be specific, the second battery pack 30 includes: a plurality of second batteries 72 storing the electric power for generating the rotational power for driving the wheels; a second battery accommodating container 74 made of insulating resin and accommodating the plurality of second batteries 72; and a second air diffuser 76 configured to diffuse the air inside the second battery accommodating container 74. An air inlet 74a is formed on a right side surface of the second battery accommodating container 74, and an air outlet 74b is formed on a left side surface of the second battery accommodating container 74.

As shown in FIG. 3, gaps, through which the air discharged from air discharge holes 76c of the second air diffuser 76 flows toward the air outlet 74b of the second battery accommodating container 74, are formed around the second batteries 72 accommodated in the second battery accommodating container 74. In the second battery accommodating container 74, a space accommodating the plurality of second batteries 72 (electric components) is a second electric component accommodating space Q2. The second battery pack 30 (including the second batteries 72) is arranged behind the first battery pack 28 and at the vehicle width direction middle portion of the vehicle body 12.

As shown in FIG. 3, the inverter unit 32 includes: the inverter 82 configured to electrically generate AC power from DC power; and an inverter accommodating container 84 made of insulating resin and accommodating the inverter 82. The inverter accommodating container 84 is formed in a rectangular solid shape configured such that a forward and rearward direction length thereof is longer than a rightward and leftward direction length thereof. A first air inlet 84a is formed at a front end portion of the inverter accommodating container 84, and a second air inlet 84b is formed at a rear end portion of the inverter accommodating container 84. An air outlet 84c is formed at the front end portion of the inverter accommodating container 84. Gaps, through which the air taken in through the first air inlet 84a and the second air inlet 84b flows toward the air outlet 84c, are formed around the inverter 82 accommodated in the inverter accommodating container 84. In the inverter accommodating container 84, a space accommodating the inverter 82 is a third electric component accommodating space Q3. The inverter unit 32 (including the inverter 82) is arranged inside the rear pillar pipe portion 22c which serves as the "second guard pipe" in the vehicle width direction, and outside the first battery pack 28 (including the first batteries 54) and the second battery pack 30 (including the second batteries 72) in the vehicle width direction. As shown in FIG. 2, the motor 26 is arranged behind the inverter unit 32 (including the inverter 82).

As shown in FIG. 4, the air supply mechanism 34 includes a first air flowing pipe 86, a second air flowing pipe 88, an air blower 90, a filter 92, and pipes 94a to 94g.

As shown in FIG. 4, the first air flowing pipe 86 is constituted by a part of a vehicle body structure, that is, the rear pillar pipe portion 22d and a right half of the rear cross pipe portion 22f. The rear pillar pipe portion 22d is a "first guard pipe" arranged at one of rightward and leftward direction (vehicle width direction) outer sides of the boarding space S1 to extend to the upper side of the seat 20 (FIG. 1). To be specific, in the present embodiment, the rear pillar pipe portion 22d which serves as the "first guard pipe" also serves as the first air flowing pipe 86. The first air flowing pipe 86 includes: a first air inlet 86a which is open in a space S2 outside the vehicle body 12; and a first air outlet 86b communicating with the electric component accommodating spaces Q1 to Q3.

Figure 5:
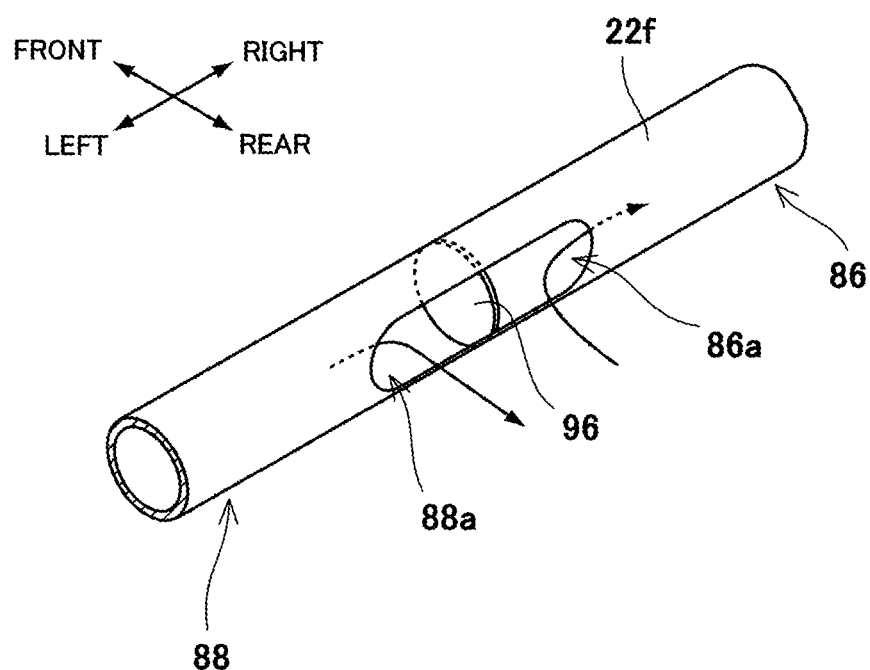
FIG. 5 is a perspective view showing the configurations of a first air inlet and a second air outlet.

FIG. 5 is a perspective view showing the configurations of the first air inlet 86a and a second air outlet 88a. As shown in FIG. 5, a separating wall 96 which separates the first air flowing pipe 86 and the second air flowing pipe 88 from each other is provided at a rightward and leftward direction middle portion of the rear cross pipe portion 22f. The first air inlet 86a is formed at a portion located in a vicinity of the separating wall 96 of the right half of the rear cross pipe portion 22f, and faces rearward. As shown in FIG. 4, the first air outlet 86b is formed at a portion of the rear pillar pipe portion 22d which is separated from a lower end of the rear pillar pipe portion 22d in an upward direction by a predetermined distance. The first air outlet 86b faces an inside (in the present embodiment, a left side) of the vehicle body 12. As above, the first air inlet 86a is arranged higher than the first battery 54, the second battery 72, and the inverter 82 (electric components) and in a vicinity of a ceiling portion of the vehicle body 12. The first air outlet 86b is arranged lower than the first air inlet 86a.

As shown in FIG. 4, the second air flowing pipe 88 is constituted by a part of the vehicle body structure, that is, the rear pillar pipe portion 22c and a left half of the rear cross pipe portion 22f. The rear pillar pipe portion 22c is a "second guard pipe" arranged at the other rightward and leftward direction (vehicle width direction) outer side of the boarding space S1 to extend to the upper side of the seat 20 (FIG. 1). To be specific, in the present embodiment, the rear pillar pipe portion 22c which serves as the "second guard pipe" also serves as the second air flowing pipe 88. The second air flowing pipe 88 includes: the second air outlet 88a which is open in the space S2 outside the vehicle body 12; and a second air inlet 88b communicating with the electric component accommodating spaces Q1 to Q3.

As shown in FIG. 5, the second air outlet 88a is formed at a portion, located in the vicinity of the separating wall 96 of the left half of the rear cross pipe portion 22f, and faces rearward. As shown in FIG. 4, the second air inlet 88b is formed at a portion of the rear pillar pipe portion 22c which is separated from a lower end of the rear pillar pipe portion 22c in the upward direction by a predetermined distance. As above, the second air outlet 88a is arranged higher than the first battery 54, the second battery 72, and the inverter 82 (electric components) and in the vicinity of the ceiling portion of the vehicle body 12. The second air inlet 88b is arranged lower than the second air outlet 88a.

As shown in FIG. 4, the air blower 90 has a function of generating the flow of the air such that: the air in the space S2 outside the vehicle body 12 flows through the first air inlet 86a into the first air flowing pipe 86 and is discharged through the first air outlet 86b to the electric component accommodating spaces Q1 to Q3; and the air in the electric component accommodating spaces Q1 to Q3 flows through the second air inlet 88b into the second air flowing pipe 88 and is discharged through the second air outlet 88a to the space S2 outside the vehicle body 12. An existing turbo fan, an existing sirocco fan, or the like can be suitably selected and used as the air blower 90. As shown in FIG. 3, the air blower 90 is provided with an intake port 90a through which the air is suctioned and an exhaust port 90b through which the air is discharged. The air blower 90 is arranged inside the rear pillar pipe portion 22d as the "first guard pipe" in the vehicle width direction and outside the first battery pack 28 (including the first batteries 54) and the second battery pack 30 (including the second batteries 72) in the vehicle width direction.

As shown in FIG. 3, the filter 92 is a device configured to remove moisture and dust from the air suctioned by the air blower 90. The filter 92 includes a tubular filter case 98 and a filter material (not shown) accommodated in the filter case 98. The filter case 98 is provided with an air inlet 98a through which the air is taken and an air outlet 98b through which the air is discharged.

As shown in FIG. 3, in the air supply mechanism 34, the first air outlet 86b of the first air flowing pipe 86 and the air inlet 98a of the filter 92 communicate with each other through the pipe 94a, and the air outlet 98b of the filter 92 and the intake port 90a of the air blower 90 communicate with each other through the pipe 94b. The exhaust port 90b of the air blower 90 and the air inlet 56a of the first battery pack 28 communicate with each other through the pipe 94c, a branch joint 100, and the like, and the exhaust port 90b of the air blower 90 and the air inlet 74a of the second battery pack 30 communicate with each other through the pipe 94d, the branch joint 100, and the like. The air outlet 56b of the first battery pack 28 and the first air inlet 84a of the inverter unit 32 communicate with each other through the pipe 94e, and the air outlet 74b of the second battery pack 30 and the second air inlet 84b of the inverter unit 32 communicate with each other through the pipe 94f. The air outlet 84c of the inverter unit 32 and the second air inlet 88b of the second air flowing pipe 88 communicate with each other through the pipe 94g.

As described above, the first air outlet 86b of the first air flowing pipe 86 shown in FIG. 4 is formed at a portion of the rear pillar pipe portion 22d which is separated from the lower end of the rear pillar pipe portion 22d in the upward direction by a predetermined distance. The second air inlet 88b of the second air flowing pipe 88 shown in FIG. 4 is formed at a portion of the rear pillar pipe portion 22c which is separated from the lower end of the rear pillar pipe portion 22c in the upward direction by a predetermined distance. With this, a water storing portion 102 configured to store water is formed at the rear pillar pipe portion 22d so as to be located lower than the first air outlet 86b, and a water storing portion 104 configured to store water is formed at the rear pillar pipe portion 22c so as to be located lower than the second air inlet 88b. Discharge ports (not shown) through which the water is discharged toward a lower side of the vehicle body 12 are respectively formed on the water storing portions 102 and 104, and lid bodies (not shown) are respectively, detachably attached to the discharge ports.

As shown in FIG. 4, in a case where the air blower 90 is operated when driving the electric vehicle 10, the air is taken in through the first air inlet 86a into the first air flowing pipe 86, and the air flows through the filter 92 and the air blower 90 to be supplied to the first battery 54 and the second battery 72. The air which has taken heat from the first battery 54 and the second battery 72 is supplied to the inverter 82 which generates a larger amount of heat than the first battery 54 and the second battery 72. The air which has taken the heat from the inverter 82 flows through the second air flowing pipe 88 to be discharged through the second air outlet 88a. In a case where the water is taken in through the first air inlet 86a into the first air flowing pipe 86, the water is captured by the water storing portion 102 or the filter 92. In a case where the water is taken in through the second air outlet 88a into the second air flowing pipe 88, the water is captured by the water storing portion 104. Therefore, the water hardly reaches the first battery 54, the second battery 72, and the inverter 82 (electric components).

The present embodiment can obtain the following effects by the above configurations. To be specific, as shown in FIG. 4, the air taken in through the first air inlet 86a can be forcibly supplied to the first battery 54, the second battery 72, and the inverter 82 (electric components). Therefore, these electric components can be effectively cooled down. The first air inlet 86a and the second air outlet 88a are arranged higher than the electric components. Therefore, the water splashed when the vehicle travels on puddles or the like is not easily taken in through the first air inlet 86a and the second air outlet 88a, so that the water does not easily reach the electric components through the air flowing pipes 86 and 88. Therefore, the water is prevented from corroding electric wires and the like related to the electric components.

As shown in FIG. 3, since an air passage branches at an upstream side of the batteries 54 and 72, the air which has not yet taken the heat from the batteries 54 and 72 can be introduced to the batteries 54 and 72. As above, since the air passage is formed in parallel to the batteries 54 and 72, deviation between the temperature increases of the batteries 54 and 72 can be made smaller than in a case where the air passage is formed in series to the batteries 54 and 72.

As shown in FIG. 4, since the second air outlet 88a is formed at an upper end of the vehicle body 12, the air which has taken the heat can be prevented from directly blowing against the occupant. Thus, discomfort of the occupant due to the blowing of the heated air can be reduced.

As shown in FIG. 4, the first air flowing pipe 86 and the second air flowing pipe 88 are respectively constituted by the "guard pipes" each of which is a part of the vehicle body structure, that is, respectively constituted by the rear pillar pipe portions 22d and 22c. Therefore, to constitute the air passage of the air supply mechanism 34, it is unnecessary to use an additional structure, so that the number of parts can be prevented from increasing.

As shown in FIG. 4, the electric component accommodating spaces Q1 to Q3 communicate with one another to constitute a continuous air passage. The inverter 82 accommodated in the third electric component accommodating space Q3 located at a downstream side generates a larger amount of heat than each of the first battery 54 accommodated in the first electric component accommodating space Q1 located at an upstream side and the second battery 72 accommodated in the second electric component accommodating space Q2 located at the upstream side. Therefore, the high-temperature air which has taken the heat from the inverter 82 which generates a large amount of heat can be prevented from being supplied to the first battery 54 and the second battery 72, so that the first battery 54 and the second battery 72 can be prevented from being heated by this air.

As shown in FIG. 3, the air passage is constituted by the rear pillar pipe portions 22c and 22d respectively provided at both rightward and leftward direction sides of the vehicle body 12, and the battery packs 28 and 30 are arranged between the rear pillar pipe portions 22c and 22d such that a longitudinal direction of each of the battery packs 28 and 30 corresponds to the rightward and leftward direction. Therefore, the air flows more easily in the longitudinal direction than in a lateral direction of each of the battery packs 28 and 30. Therefore, the cooling air can be easily supplied to the entire batteries 54 and 72, so that the deviation between the temperatures of the batteries 54 and 72 can be suppressed.

As shown in FIG. 3, the first battery pack 28 (including the first batteries 54) and the second battery pack 30 (including the second batteries 72) are arranged at the vehicle width direction middle portion of the vehicle body 12, and the air blower 90 is arranged inside the rear pillar pipe portion 22*d* as the "first guard pipe" in the vehicle width direction and outside the first battery pack 28 and the second battery pack 30 in the vehicle width direction. The inverter unit 32 (including the inverter 82) is arranged inside the rear pillar pipe portion 22*c* as the "second guard pipe" in the vehicle width direction and outside the first battery pack 28 and the second battery pack 30 in the vehicle width direction. Therefore, the length of the air passage can be shortened. It should be noted that the inverter unit 32 (including the inverter 82) and the air blower 90 may be arranged outside the vehicle body frame 14 in the vehicle width direction.

As shown in FIG. 3, the air blower 90 and the inverter unit 32 are arranged in a region located behind a front end of the first battery pack 28 located at a front side and in front of a rear end of the second battery pack 30 located at a rear side. Therefore, the air passage can be shortened even in a case where a plurality of battery packs are arranged.

As shown in FIG. 3, the motor 26 is arranged behind the inverter unit 32 (including the inverter 82). Therefore, the air heated by the motor 26 is prevented from being supplied to the inverter unit 32.

As shown in FIG. 4, the first air inlet 86*a* and the second air outlet 88*a* are formed at the rear cross pipe portion 22*f* extending in a direction perpendicular to the upper-lower direction and arranged at the upper end of the vehicle body 12. Therefore, water drops flowing along the rear pillar pipe portions 22*c* and 22*d* extending in the upper-lower direction can be prevented from being introduced to the air passage.

As shown in FIG. 4, each of the filter 92 and the water storing portions 102 and 104 serves as a "water capturing portion" which prevents the water, having entered into the first air flowing pipe 86 or the second air flowing pipe 88, from flowing toward the first battery 54, the second battery 72, and the inverter 82 (electric components). Therefore, the corrosion of the electric components by the moisture can be prevented. It should be noted that a centrifugal separator or the like may be used as the "water capturing portion".

As shown in FIG. 5, since the first air flowing pipe 86 and the second air flowing pipe 88 are separated from each other by the separating wall 96, the air which has taken the heat from the electric components can be prevented from being suctioned back into the first air flowing pipe 86.

As shown in FIG. 5, the first air inlet 86*a* and the second air outlet 88*a* are provided at a rightward and leftward direction middle portion of the rear cross pipe portion 22*f*. Therefore, even in a case where the electric vehicle 10 overturns, the first air inlet 86*a* and the second air outlet 88*a* can be located at positions higher than the ground surface or the road surface. With this, the water can be prevented from entering into the first air flowing pipe 86 and the second air flowing pipe 88. Since the first air inlet 86*a* and the second air outlet 88*a* are open rearward, rain water and the like can be prevented from entering into the first air flowing pipe 86 and the second air flowing pipe 88 while the electric vehicle 10 is traveling.

As shown in FIG. 4, the air blower 90 is arranged at a side opposite to a side where the inverter unit 32 is provided. Therefore, in a state where the battery packs 28 and 30 are arranged in the vicinity of the vehicle width direction middle portion of the vehicle body 12, the air blower 90 and the inverter unit 32 can be respectively arranged at both vehicle width direction sides of the battery packs 28 and 30. With this, a center of gravity of the vehicle body 12 can be located close to the vehicle width direction middle portion.

It should be noted that at least a part of the separating wall 96 shown in FIG. 5 may be removed. To be specific, an upstream end portion of the first air flowing pipe 86 and a downstream end portion of the second air flowing pipe 88 may communicate with each other. With this, the air blower 90 may generate the flow of the air such that at least a part of the air discharged from the second air flowing pipe 88 flows into the first air flowing pipe 86. In this case, the air can be circulated in the air supply mechanism 34. Therefore, the amount of air discharged from the second air outlet 88*a* and the amount of air taken from the first air inlet 86*a* can be reduced. On this account, the first air inlet 86*a* and the second air outlet 88*a* can be made small, so that the water can be prevented from entering into the first air flowing pipe 86 and the second air flowing pipe 88.

In a case where the amount of heat generated by the electric components is small, the first air inlet 86*a* and the second air outlet 88*a* in FIG. 5 may be closed, and the separating wall 96 may be removed. In this case, the moisture can be more effectively prevented from entering into the air passage. Further, in this case, the air circulates in the rear cross pipe portion 22*f* and the rear pillar pipe portions 22*c* and 22*d*, so that the pipe portions 22*f*, 22*c*, and 22*d* can serve as heat exchangers.

The first air inlet 86*a* and the second air outlet 88*a* in FIG. 5 may be arranged so as to be spaced apart from each other in the rightward and leftward direction. In this case, the discharged air can be prevented from being suctioned back into the first air inlet 86*a*. The first air inlet 86*a* and the second air outlet 88*a* may be arranged so as to be open downward. In this case, the rain water can be more effectively prevented from entering into the first air inlet 86*a* and the second air outlet 88*a*. Further, the first air inlet 86*a* and the second air outlet 88*a* may be respectively provided with filters. In this case, loaded objects, such as straw, rolled up when the cargo bed 24 is inclined rearward can be prevented from getting into the first air inlet 86*a* and the second air outlet 88*a*.

The present invention may be applied to an electric vehicle including a roof. In a case where the roof and the door separate the inside and outside of the boarding space S1 from each other, the first air inlet 86*a* and the second air outlet 88*a* may be open toward the boarding space S1. In this case, the moisture can be more effectively prevented from entering into the first air inlet 86*a* and the second air outlet 88*a*.

To prevent the rain water and the like from entering into the first air inlet 86*a* and the second air outlet 88*a* in FIG. 5, water capturing portions, such as eaves, may be provided around the first air inlet 86*a* and the second air outlet 88*a*. For example, the water capturing portions, such as the eaves, may be provided so as to extend rearward from upper sides of the first air inlet 86*a* and the second air outlet 88*a*.

In addition to a case where the inverter 82 in FIG. 3 is cooled down by the air, the inverter 82 may be cooled down by a liquid cooling medium from which the heat has been radiated by a heat exchange. For example, in a case where only the cooling using the liquid cooling medium causes the deviation of the temperature of the inverter 82, a high-temperature portion of the inverter 82 may be intensively cooled down by the air which has flowed through the batteries 54 and 72. In this case, the cooling performance can be improved, and the temperature increase of the entire inverter 82 can be effectively suppressed.

The inverter unit 32 (including the inverter 82) shown in FIG. 3 may be arranged between the first battery pack 28 (including the first batteries 54) and the second battery pack 30 (including the second batteries 72). The air blower 90 may be arranged at the side where the inverter 82 is arranged. In these cases, a space for arranging the battery packs 28 and 30 can be further increased.

Respective components constituting the air supply mechanism 34 shown in FIG. 4 may be arranged reversely in the rightward and leftward direction. Each of the first air inlet 86*a* and the second air outlet 88*a* may be formed at the pipe portion 22*g*, 22*h*, or 22*e* extending in a direction perpendicular to the upper-lower direction or the pipe portion 22*a*, 22*b*, 22*c*, or 22*d* extending in the upper-lower direction.

Examples of the electric component air-cooled by the air supply mechanism 34 may include a motor, a DC-DC converter, and a controller in addition to the first battery 54, the second battery 72, and the inverter 82. To be specific, the electric components are only required to be electric parts which generate the heat by the electric energy for generating the rotational power for driving the wheels. The number of batteries may be one or three or more. In a case where the battery and the electric components other than the battery are cooled, it is preferable that the battery be cooled first, and the electric components other than the battery be then cooled.

INDUSTRIAL APPLICABILITY

As above, the electric vehicle according to the present invention has an excellent effect of being able to effectively cool down the electric component. Therefore, it is useful to widely apply the present invention to electric utility vehicles and the like which can achieve the significance of this effect.

REFERENCE CHARACTER LIST

Q1 to Q3 electric component accommodating space
S2 space
10 electric vehicle
12 vehicle body
34 air supply mechanism
54 first battery (electric component)
72 second battery (electric component)
82 inverter (electric component)
86 first air flowing pipe
86*a* first air inlet
86*b* first air outlet
88 second air flowing pipe
88*b* second air inlet
88*a* second air outlet
90 air blower

The invention claimed is:
1. An electric vehicle comprising:
an electric component which generates heat from electric energy for generating rotational power for driving wheels;
an electric component accommodating space accommodating the electric component; and
an air supply mechanism configured to supply cooling air to the electric component accommodated in the electric component accommodating space, wherein:
the air supply mechanism includes
a first air flowing pipe including a first air inlet which is open in a space outside a vehicle body and a first air outlet communicating with the electric component accommodating space,
a second air flowing pipe including a second air inlet communicating with the electric component accommodating space and a second air outlet which is open in the space outside the vehicle body, and
an air blower configured to generate a flow of the air such that air in the space outside the vehicle body flows through the first air inlet into the first air flowing pipe and is discharged through the first air outlet to the electric component accommodating space, and air in the electric component accommodating space flows through the second air inlet into the second air flowing pipe and is discharged through the second air outlet to the space outside the vehicle body;
the first air inlet and the second air outlet are arranged higher than the electric component; and
the first air outlet is formed at a portion of the first air flowing pipe, the portion being away from a lower end of the first air flowing pipe in an upper direction.
2. The electric vehicle according to claim 1, wherein each of the first air flowing pipe and the second air flowing pipe is constituted by a part of a vehicle body structure.
3. The electric vehicle according to claim 2, further comprising:
a boarding space provided on the vehicle body;
a seat provided at the boarding space;
a first guard pipe arranged at one of two vehicle width direction outer sides of the boarding space so as to extend to an upper side of the seat; and
a second guard pipe arranged at the other vehicle width direction outer side of the boarding space so as to extend to the upper side of the seat, wherein:
at least a part of the first air flowing pipe is constituted by the first guard pipe; and
at least a part of the second air flowing pipe is constituted by the second guard pipe.
4. The electric vehicle according to claim 3, wherein:
the electric component accommodating space comprises a plurality of electric component accommodating spaces, and the plurality of electric component accommodating spaces communicate with one another to constitute a continuous air passage; and
the electric component comprises a first electric component accommodated in an electric component accommodating space located at a downstream side and a second electric component accommodated in an electric component accommodating space located at an upstream side, and an amount of heat generated by the first electric component is larger than an amount of heat generated by the second electric component.
5. The electric vehicle according to claim 4, wherein:
the first electric component is an inverter;
the second electric component is a battery;
the battery is arranged at a vehicle width direction middle portion of the vehicle body;
the air blower is arranged inside the first guard pipe in a vehicle width direction and outside the battery in the vehicle width direction; and
the inverter is arranged inside the second guard pipe in the vehicle width direction and outside the battery in the vehicle width direction.
6. The electric vehicle according to claim 1, further comprising a water capturing portion configured to prevent water, which has entered into the first air flowing pipe or the second air flowing pipe, from flowing toward the electric component.

7. The electric vehicle according to claim 1, wherein the first air inlet and the second air outlet are arranged in a vicinity of a ceiling portion of the vehicle body.

8. The electric vehicle according to claim 1, wherein:
an upstream end portion of the first air flowing pipe and a downstream end portion of the second air flowing pipe communicate with each other; and
the air blower generates the flow of the air such that at least a part of the air discharged from the second air flowing pipe is taken into the first air flowing pipe.

9. The electric vehicle according to claim 1, wherein the first air flowing pipe is provided with a water storing portion located lower than the first air outlet.

10. The electric vehicle according to claim 9, wherein the water storing portion includes at least one discharge port having at least one lid body detachably attached to each of the at least one discharge port through which water is discharged toward a lower side of the vehicle body.

11. The electric vehicle according to claim 1, wherein the second air flowing pipe is provided with a water storing portion located lower than the second air inlet.

12. The electric vehicle according to claim 1, wherein the first air inlet and the second air outlet face rearward.

13. An electric vehicle comprising:
an electric component which generates heat from electric energy for generating rotational power for driving wheels;
an electric component accommodating space accommodating the electric component;
an air supply mechanism configured to supply cooling air to the electric component accommodated in the electric component accommodating space;
a boarding space provided on a vehicle body;
a seat provided at the boarding space;
a first guard pipe arranged at one of vehicle width direction outer sides of the boarding space so as to extend to an upper side of the seat; and
a second guard pipe arranged at the other vehicle width direction outer side of the boarding space so as to extend to the upper side of the seat, wherein:
the air supply mechanism includes
a first air flowing pipe and a second air flowing pipe which are open in a space outside the vehicle body and communicate with the electric component accommodating space, and
an air blower configured to generate a flow of the air such that air in the space outside the vehicle body flows through the first air flowing pipe and is discharged to the electric component accommodating space, and air in the electric component accommodating space flows through the second air flowing pipe and is discharged to the space outside the vehicle body;
at least a part of the first air flowing pipe is constituted by the first guard pipe; and
at least a part of the second air flowing pipe is constituted by the second guard pipe.

14. An electric vehicle comprising:
an electric component which generates heat from electric energy for generating rotational power for driving wheels;
an electric component accommodating space accommodating the electric component; and
an air supply mechanism configured to supply cooling air to the electric component accommodated in the electric component accommodating space, wherein:
the air supply mechanism includes
a first air flowing pipe and a second air flowing pipe which are open in a space outside a vehicle body and communicate with the electric component accommodating space, and
an air blower configured to generate a flow of the air such that air in the space outside the vehicle body flows through the first air flowing pipe and is discharged to the electric component accommodating space, and air in the electric component accommodating space flows through the second air flowing pipe and is discharged to the space outside the vehicle body;
an upstream end portion of the first air flowing pipe and a downstream end portion of the second air flowing pipe communicate with each other; and
the air blower generates the flow of the air such that at least a part of the air discharged from the second air flowing pipe is taken into the first air flowing pipe.

* * * * *